United States Patent [19]

Ettori

[11] Patent Number: 5,090,489
[45] Date of Patent: Feb. 25, 1992

[54] MACHINING UNIT FOR MACHINE TOOLS, IN PARTICULAR FOR MACHINE TOOLS WITH SEVERAL MACHINING STATIONS

[75] Inventor: Ignazio Ettori, Carcina, Italy

[73] Assignee: Porta S.r.l., Italy

[21] Appl. No.: 443,431

[22] Filed: Nov. 30, 1989

[51] Int. Cl.$^5$ .............................................. B23Q 5/32
[52] U.S. Cl. ..................................... 173/165; 408/137
[58] Field of Search ............... 173/148, 150, 165, 163, 173/166, 167; 408/137

[56] References Cited

U.S. PATENT DOCUMENTS

| | | | |
|---|---|---|---|
| 3,126,766 | 3/1964 | Bent | 408/137 |
| 3,640,147 | 2/1972 | Fantoni | 408/137 |
| 3,885,635 | 5/1975 | Menzel | 408/137 |
| 4,201,271 | 5/1980 | Evans | 408/137 |
| 4,362,444 | 12/1982 | Watkins | 408/137 |
| 4,450,857 | 5/1984 | Baug et al. | 408/137 |
| 4,546,834 | 10/1985 | Menzel | 408/137 |

Primary Examiner—Mark Rosenbaum
Assistant Examiner—Scott A. Smith
Attorney, Agent, or Firm—Kirschstein, Ottinger, Israel & Schiffmiller

[57] ABSTRACT

Machining unit for machine tools with several machining stations with a tool spindle (4), which is accommodated longitudinally displaceably on the inside of a displacement unit (1) which consists of a hollow threaded spindle (5) and a threaded nut (6) with associated sleeve (8). The tool spindle (4) is mounted rotatably on the front side in the threaded nut but is not displaceable axially in relation to the threaded nut (6). On the driving side the tool spindle is formed as a slotted shaft (35) which is, for example, in a work connection with a hub-like toothed wheel (24) which is rotatably but not axially displaceably mounted in the body (2) of the machining unit (1). The threaded spindle (5) is mounted rotatably but not axially displaceably on the inside of the machining unit (1) and is drivable via a motor (23) which is drivable in both directions of rotation.

2 Claims, 2 Drawing Sheets

MACHINING UNIT FOR MACHINE TOOLS, IN PARTICULAR FOR MACHINE TOOLS WITH SEVERAL MACHINING STATIONS

BACKGROUND OF THE INVENTION

The present innovation relates to a machining unit for machine tools with several machining stations. As is known from the prior art, for the automatic machining of components, such as for example valves, water cocks and similar parts, the chip removing machining is carried out in consecutive operations by a large number of machining stations, for example by turning, drilling, thread cutting or similar machining. In this connection the workpieces are arranged on a rotating faceplate in the machine tool. The tools of the machining units used carry out the necessary feed movements using NC motors. In the known machining units of this type, an axial arrangement of the spindle mounting and of a threaded spindle for feeding the spindle mounting is provided, the threaded spindle being mounted in a stationary stop nut on the rear side of the spindle mounting.

This known construction has the disadvantage that the machining unit has a considerable length and thus a considerable space requirement. It has already been attempted to reverse the arrangement between spindle mounting and driving spindle for the tool feed. In this case the driving spindle projects from the housing on the tool side, that is to say in precisely the place in which the machining of the workpiece is carried out, as a result of which the threaded spindle is exposed to constant dirtying which is caused by chip deposits and coolant deposit. This can lead to impairment of the free rotation movement of the threaded spindle in the threaded nut. It has also been attempted in embodiments of this type to eliminate the dirtying problem of the freely protecting part of the threaded spindle in the vicinity of the tool by providing concertina guards. In addition to a considerable spaced requirement for these guards, such an embodiment has the disadvantage that there is a certain inertia when the displacement movement of the threaded spindle is carried out. This inertia arises as a result of the frictional forces which exist and as a result of the fact that in the known embodiments the rotation movement of the threaded spindle takes place with the interposition of bearings which, although they permit a rotation movement of the threaded spindle, impede a displacement of the same in an axial direction. Furthermore, in known embodiments, the threaded spindle is arranged rigidly on the sleeve-shaped component or incorporated directly in the sleeve. As, in these known embodiments of the sleeve-shaped component, both the tool spindle and the bearing of the spindle are to be accommodated in the sleeve-shaped component, it was necessary to provide threaded spindles with large dimensions, and thus the threaded nut also had to have large dimensions with the result that the device has considerable inertia.

In the known embodiments, which have considerable extension in the axial direction and bearing points in only two places which are relatively far from one another, eccentric forces can act upon the tool during machining of the workpiece, forces which lead to a transverse loading of the mounting device of the tool spindle and thus cause a deviation of the axis of the workpiece. In the known embodiments, the threaded spindle/threaded nut axis is displaced axially in relation to the axis of the mounting sleeve and the tool spindle. This particular arrangement frequently leads to overstressing of the bearings of the sleeve, as a result of which stresses with a component perpendicular to the feed axis arise, which has a negative influence on the working accuracy and the service life of the machine components. The known machining units are thus not in a position to meet the demands placed on machines today.

SUMMARY OF THE INVENTION

The object of the innovation is to propose a machining unit of the type mentioned, in which the mutual arrangement between spindle mounting and driving spindle is provided in such a manner that a considerable reduction in the space requirement of the entire machining unit is achieved.

It is also the object of the innovation to produce a machining unit of the type mentioned, in which, as a result of considerably smaller mass moment of inertia, a quicker machining of the workpieces is possible and at the same time a very high machining accuracy is achieved.

According to the innovation, the object is achieved with a machining unit for machine tools with several machining stations with a drivable tool spindle and a rotatably driven threaded spindle/threaded nut unit, which is drivable in both directions of rotation and is provided for the moving out and moving in of the tool spindle, in that the threaded spindle/threaded nut unit (3) is formed as a concentric constructional unit which contains a threaded spindle (5), which is hollow in the axial direction and rotatably drivably mounted in the body (2) of the machining unit (1) but is arranged fixed positionally in the axial direction, and a threaded nut, which in relation to the threaded spindle is arranged coaxially on the outside and has a nut part (7) and a sleeve (8) which is arranged movably between machining unit, the tool spindle (4) penetrating the threaded spindle/threaded nut unit (3) coaxially and being mounted on the tool side rotatably but not axially displaceably in the sleeve (8) of the threaded nut (6) and on its opposite, driving side rotatably and axially displaceably in the body (2) of the machining unit (1).

Further features of the innovation are given in the characterizing part of the subordinate claims. With the proposed machining unit, significant advantages can be achieved, which are described in greater detail below.

By using a hollow threaded spindle and providing a threaded nut, which surrounds the latter coaxially and accommodates the tool spindle, an extraordinarily compact device with a low space requirement is produced. By means of the coaxial arrangement of the threaded spindle, it is possible to carry out in a simple manner in the body of the machining unit both the mounting of the threaded spindle and of the threaded nut with its sleeve as well as of the spindle which passes through. The threaded nut can have a considerably length which does not, however, influence the overall length or the space requirement of the machining unit. This feature, together with a telescopic guide of the sleeve of the threaded nut in the body of the machining unit, ensure a smooth coaxial displacement of the sleeve of the threaded nut, which accommodates the spindle, and thus of the respective tool used. The control of the rotary drive for the threaded spindle, which is advantageously formed as a ball-circulating spindle and is not displaceable in the axial direction, is made possible by a simple driving of the ball-circulating spindle via the body of the machining unit, for example by means of a controllable direct current motor which is connected to a NC device or other means of control of the machine tool. The driving of the tool spindle is carried out in known manner. A further advantage of the proposed device is that a small number of machine components is necessary and their assembly is possible in a simple and rapid manner. The proposed machining unit can accept different tools, for example for the performance of turning, drilling and thread cutting work. The proposed machining unit is flexible, that is to say universally applicable and can be manufactured in a modular manner. The proposed machinig units are thus mutually interchangeable.

Further features, advantages and details of the new machining unit are now given in the following description, the drawings and the subordinate claims. The machining unit is described in greater detail below with reference to the attached drawings.

DESCRIPTION OF THE PREFERRED EMBODIMENTS

Figure 1:
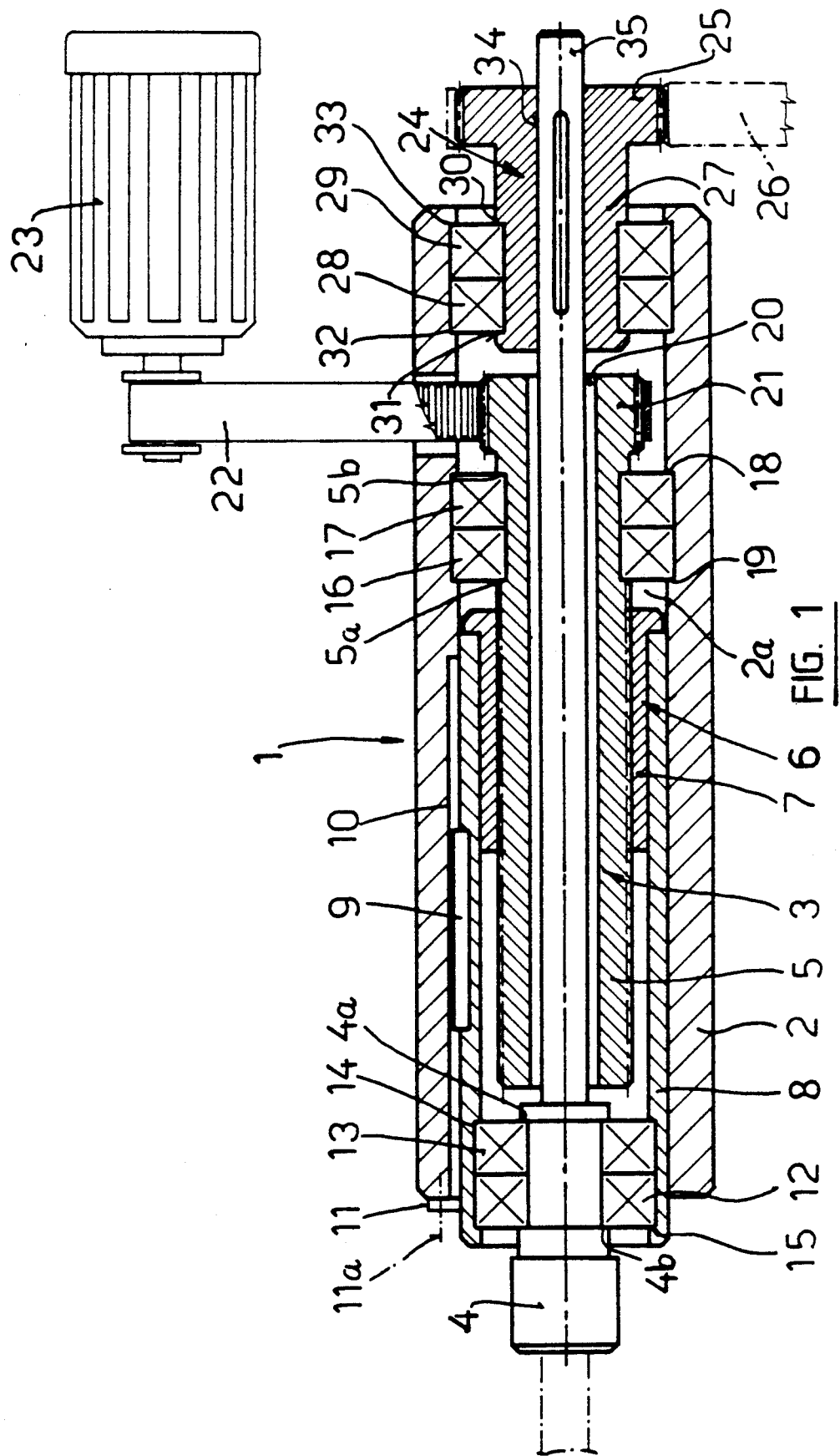
FIG. 1 shows a longitudinal cross-section of the new machining unit with retracting tool spindle.
Figure 2:
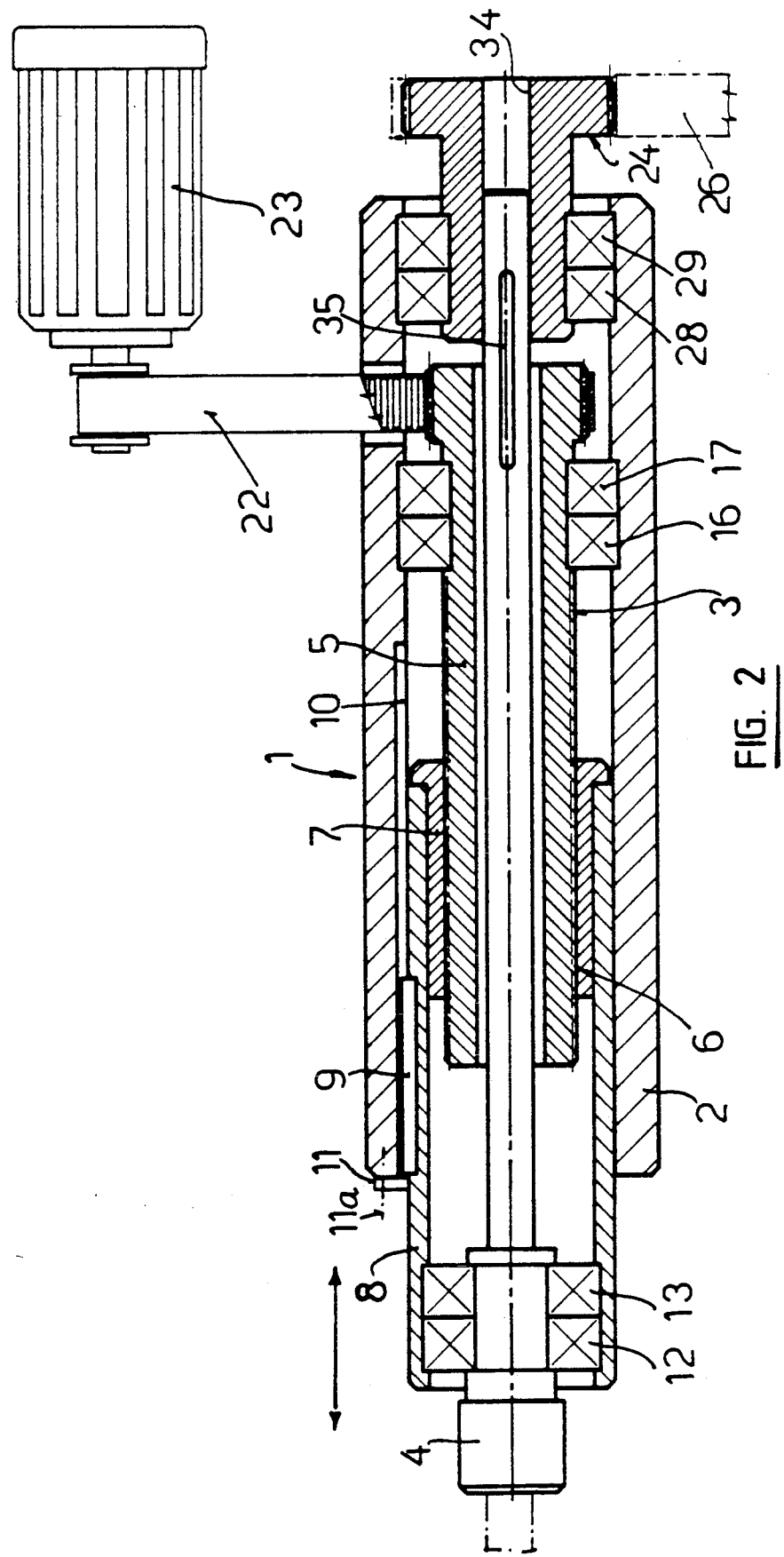
FIG. 2 shows a longitudinal cross-section similar to FIG. 1 with the tool spindle in its fully extended position.

With reference to the drawings, the proposed machining unit is indicated by 1. The machining unit has a basic body 2 which is fixed to the machine tool in known manner (not shown). In the embodiment represented, the body 2 of the machining unit 1 if formed like a sleeve. In the sleeve-like body 2, a unit 3, which consists of a threaded spindle 5 and a threaded nut 6, and a tool spindle 4, which passes through, are arranged coaxially to one another. In the example represented, the threaded spindle is formed as a ball-circulating 5, on which a threaded nut 6 is movably arranged. The threaded nut 6 has a nut part 7 and a sleeve 8 which is fixed to the nut part 7 in a suitable manner. As can be seen in the drawing, the sleeve 8 is arranged telescopically displaceably in the through hole 2a of the body 2. 9 indicates a feather key which is arranged in a slot of the sleeve 8 and is accommodated displaceably in a groove 10 of the body 2. A stop 11 limits the outward movement of the sleeve 8 as is described in greater detail below. The stop consists of a plate which is fixed to the body 2 by means of screws 11a. The maximum retraction position of the sleeve 8 can be determined by a further stop, which is not shown in greater detail, or effected during the retraction movement of the nut part 7 of the threaded nut on the threaded spindle 5. 12 and 13 represent ball bearings for the accommodation of the tool spindle 4 on the inside of the sleeve 8 of the threaded nut 6. These bearings are arranged between a first stop 14 and a second stop 15. These stops can also be formed by spring rings. The stops on the tool spindle 4 are indicated by 4a and 4b. By means of the construction represented, the tool spindle 4 can carry out a free rotation movement but it is prevented from carrying out an axial displacement in relation to the threaded nut 6, with which it forms a rigid constructional unit in the axial direction.

As can be seen in the drawing, the threaded spindle 5 is supported via ball bearings 16 and 17. These ball bearings are arranged freely rotatably but axially fixed between the stops 18 or 19 or 5a and 5b. Thus the threaded spindle 5 also can carry out a free rotation movement in both directions of rotation but it is not possible for the threaded spindle 5 to carry out an axial displacement. On the inside of the threaded spindle 5 an axial drill hole 20 is provided. This drill hole 20 makes possible free passage of the tool spindle 4. In the embodiment represented, on the threaded spindle 5, a toothed wheel 21 is supported which, for example via a toothed belt 22, is in work connection with a reversibly drivable motor 23, advantageously a controllable direct current motor. The direct current motor 23 is advantageously controlled via the NC device of the machine tool. At the side opposite the tool, the tool spindle 3 is in a rotationally fixed manner but axially displaceably in work connection with a hub-like toothed wheel 24. The hub-like toothed wheel 24 has a toothing 25 which via a toothed belt is in work connection with a driving wheel 26. The toothed wheel 25 has a hub-like extension 27 which serves to accommodate the bearings 28, 29. The extension accommodates the ball bearings 28 and 29 between two stops 30, 31. The ball bearings 28, 29 are also arranged between stops 32 and 33 in the body 2 of the machining unit. In this manner, the hub-like toothed wheel 24 can be mounted freely rotatably but not axially displaceably. The toothed wheel 24 has a profiled through hole 34, which is formed for example as a tooth profile and accommodates axially displaceably the end 35 of the tool spindle 4 which is formed for example as a slot profile shaft. Between the profiled end piece 35 of the tool spindle and the toothed wheel 24 where is thus a rotationally fixed connection but the components can carry out a longitudinal displacement. The exact embodiment of this end piece or of the through hole 34 can be freely selected.

The method of functioning of the proposed machining unit can be derived from the above description. From its rest position according to FIG. 1, the tool is moved forwards according to a desired working stroke. This working stroke is effected via the controllable motor 23 which determines the number of rotations of the threaded spindle 4. This also brings about a corresponding outward movement of the threaded nut 6 and of the tool spindle 4. The inward movement of the tool spindle 4 is carried out by reversing the direction of rotation of the motor 23.

During the axial feed movement of the tool spindle 4, the profiled end piece 35 will carry out a displacement movement on the inside of the toothed driving wheel 24. It can be inferred from the description above that the object of the innovation is achieved in an effective manner by means of the machining unit which is constructed in a modular or flexible manner. A compact constructional unit is produced and a very accurate guidance of the tool is achieved. The desired accuracy is achieved essentially by means of the telescopically formed guide of the sleeve 8 of the threaded nut 6 and by means of the proposed considerably length of the nut part 7.

It is essential for the innovation that the tool spindle is arranged concentrically in relation to the threaded spindle and in relation to the threaded nut. The proposed machining unit can advantageously be used for different operations which are carried out in machine tools with several machining stations. A versatile machining unit is produced which can be interchanged in the machine in a modular manner with other machinig units.

All features, which are given in the description, the claims and the drawings, are essential to the present innovation, both individually and in combination with one another.

I claim:

1. A machining unit for machine tools with several machining stations, including a drivable tool spindle and a rotatably driven reversible threaded spindle/threaded nut unit, said nut unit being formed as a concentric unit including a threaded, axially hollow spindle rotatably drivably mounted on said machining unit and axially restrained thereon, and a threaded nut arranged coaxially of said spindle, said nut including a nut part and a sleeve movable between two end positions inside said machining unit, said tool spindle penetrating said nut unit coaxially and being rotatably mounted on a side accommodating the tool, the threaded spindle being formed as a ball-circulating spindle and the threaded nut as a nut part, the nut part being fixed rigidly to a sleeve having a stop member which interacts with a counter-stop member of said machining unit, in order to determine an end position for said tool spindle, said sleeve having a recess defined by two stops, to accommodate two ball bearings for said spindle, said ball bearings being arranged between two further stop members, one end of said tool spindle being formed as a profiled shaft mounted rotatably and axially displaceable in a hub-like gear wheel which is rotatably mounted between the stops of said machining unit and projects therefrom with a gear wheel part driven by drive means for the machine tool.

2. A machining unit according to claim 1, wherein on a portion of the threaded spindle opposite the tool, a driving gear wheel is provided, which is connected via a drive belt to a DC motor for driving said nut unit.

* * * * *